US007430207B2

(12) United States Patent
Wu et al.

(10) Patent No.: US 7,430,207 B2
(45) Date of Patent: Sep. 30, 2008

(54) PREEMPTIVE WEIGHTED ROUND ROBIN SCHEDULER

(75) Inventors: Chiutien Wu, Changhua (TW); Lan-Feng Wang, Pingzhen (TW)

(73) Assignee: Reti Corporation, Taipei (TW)

( * ) Notice: Subject to any disclaimer, the term of this patent is extended or adjusted under 35 U.S.C. 154(b) by 682 days.

(21) Appl. No.: 11/108,777

(22) Filed: Apr. 19, 2005

(65) Prior Publication Data

US 2006/0176807 A1    Aug. 10, 2006

Related U.S. Application Data

(60) Provisional application No. 60/649,909, filed on Feb. 7, 2005.

(51) Int. Cl.
*H04L 12/28* (2006.01)
*G01R 31/08* (2006.01)
*G06F 11/00* (2006.01)

(52) U.S. Cl. .............. 370/395; 370/229; 370/351; 370/395.41; 370/395.42; 370/235.1

(58) Field of Classification Search ........ 370/395, 370/229, 351, 235.1, 395.41, 395.42
See application file for complete search history.

(56) References Cited

U.S. PATENT DOCUMENTS

| | | | |
|---|---|---|---|
| 6,359,861 B1 * | 3/2002 | Sui et al. ............ | 370/230 |
| 6,963,576 B1 * | 11/2005 | Lee .................... | 370/411 |
| 7,328,032 B2 * | 2/2008 | Billing et al. ......... | 455/466 |
| 2004/0120258 A1 * | 6/2004 | Mattila ................ | 370/239 |
| 2005/0147034 A1 * | 7/2005 | Zhao et al. ........... | 370/229 |
| 2005/0195843 A1 * | 9/2005 | Ahmed et al. ......... | 370/411 |
| 2006/0098680 A1 * | 5/2006 | Kelesoglu et al. ..... | 370/444 |

* cited by examiner

*Primary Examiner*—Huy D. Vu
*Assistant Examiner*—Shafiqul Khan

(57) ABSTRACT

The present invention is to disclose a scheduler which comprising a priority tagging module for receiving a plurality of information chucks, a plurality of output lines, and a WRR (weighted round robin) module. In this regards, each information chucks are tagged with a priority tag by said priority tagging module according to a priority classification scheme. In addition, the WRR module further comprises a bucket list, which has a plurality of buckets, and a control module. Each bucket stores a ticket, which comprises an identification representing one of the plurality of output lines and an associated weight value of the represented output line. Besides, the control module receives the tagged information chucks from the priority tagging module and schedules the tagged information chucks into the plurality of output lines according to a scheduling scheme based on said bucket list.

16 Claims, 5 Drawing Sheets

PREEMPTIVE WEIGHTED ROUND ROBIN SCHEDULER

CROSS REFERENCE TO RELATED APPLICATIONS

This application claims the benefit of U.S. Provisional Application No. 60/649,909, filed on Feb. 7, 2005, which is herein incorporated by reference for all intents and purposes.

BACKGROUND OF THE INVENTION

1. Field of the Invention

The present invention generally relates to scheduler, and more particularly to preemptive weighted round robin scheduler.

2. Description of the Prior Art

In conventional arbitration scheme, the strict (real time) traffic could be served by different priority scheme like high/low queues, but it cannot use the bandwidth in fair and efficient way even more it could cause starvation if no proper scheme to avoid. The WRR, weighted round robin, scheme scans the weight of all requests in a predefined order to decide which request could grant the service and the corresponding weight is adjusted after service, for certain request there is no guarantee to preempt other request even user want to, this scheme could provide controllable bandwidth among all requests under fair behavior without starvation hazard. On contrast to high/low queues, the WRR scheme could provide faired bandwidth usage but could not preempt bandwidth for critical traffics.

Summarized, there is a need for a scheduling method and system to support both preemptive and non-preemptive traffics with faired and efficient bandwidth utilization.

SUMMARY OF THE INVENTION

Therefore, in accordance with the previous summary, objects, features and advantages of the present disclosure will become apparent to one skilled in the art from the subsequent description and the appended claims taken in conjunction with the accompanying drawings.

One objective of the present invention is to disclose a scheduler which comprising a priority tagging module for receiving a plurality of information chucks, a plurality of output lines, and a WRR (weighted round robin) module. In this regards, each information chucks are tagged with a priority tag by said priority tagging module according to a priority classification scheme. In addition, the WRR module further comprises a bucket list, which has a plurality of buckets, and a control module. Each bucket stores a ticket, which comprises an identification representing one of the plurality of output lines and an associated weight value of the represented output line. Besides, the control module receives the tagged information chucks from the priority tagging module and schedules the tagged information chucks into the plurality of output lines according to a scheduling scheme based on said bucket list.

In this regards, the priority classification scheme is a combination of a pre-determination scheme and a random determination scheme. The information chuck is classified into a plurality of priority classes by a property of the information chuck in the pre-determination scheme. And the information chuck is classified into a plurality of priority classes by a random in a given probability in said random determination scheme. In details, the scheduling scheme based on said bucket list further comprises choosing a chuck with a high priority tag, masking out other low priority tagged chucks, and performing at least one procedure on a target bucket of said bucket list. The procedure is performed by the following steps: determining that whether any chucks waited in an associated output line, represented by the identification of the ticket stored in the target bucket, sending waited chuck to the associated output line and determining that whether the weight value of the ticket is greater than zero when any chucks is waited in the associated output line, decreasing the weight value of the ticket stored in the target bucket when the weight value is determined greater than zero, and reloading the weight value of the ticket with an initial weight value associated with the output line and shift the ticket stored in the target bucket to the bottom bucket of the bucket list. Furthermore, when any chucks is not waited in the associated output line, repeat performing the procedure by assigning a next bucket of the target bucket as new target bucket.

BRIEF DESCRIPTION OF THE DRAWINGS

The accompanying drawings incorporated in and forming a part of the specification illustrate several aspects of the present invention, and together with the description serve to explain the principles of the disclosure. In the drawings.

DETAILED DESCRIPTION OF THE PREFERRED EMBODIMENTS

Figure 1:
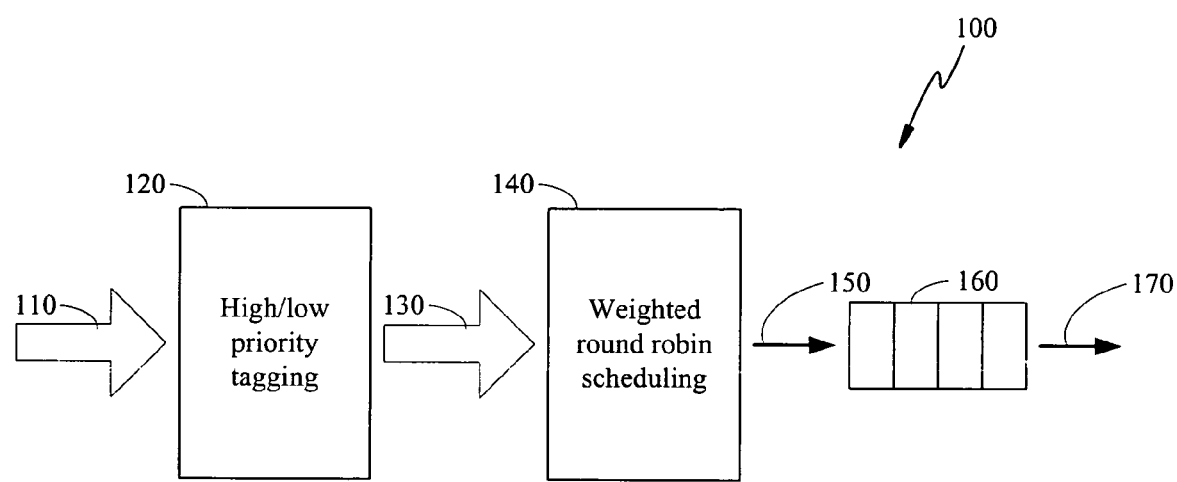
FIG. 1 is a block diagram of an embodiment of a scheduler system in accordance with the present invention.

The present disclosure can be described by the embodiments given below. It is understood, however, that the embodiments below are not necessarily limitations to the present disclosure, but are used to a typical implementation of the invention.

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary the intent is to cover all alternatives, modifications and equivalents included within the spirit and scope of the invention as defined by the appended claims.

It is noted that the drawings presents herein have been provided to illustrate certain features and aspects of embodiments of the invention. It will be appreciated from the description provided herein that a variety of alternative embodiments and implementations may be realized, consistent with the scope and spirit of the present invention.

It is also noted that the drawings presents herein are not consistent with the same scale. Some scales of some components are not proportional to the scales of other components in order to provide comprehensive descriptions and emphasizes to this present invention.

Please refer to FIG. 1, which shows a block diagram of an embodiment of a scheduler system 100 in accordance with the present invention. The scheduler system 100 generally comprises an input module 110, a priority tagging module 120, a tagged traffics module 130, a WRR scheduling module 140, an output traffic module 150, a queue module 160, and an output module 170.

In this regards, the input module 110 is received original traffics from external access units. The original traffics could be a plurality of information chucks such as a packet, a cell, a datagram, a message, a file, which could be fixed or variable size. Beside, each received information chuck can carry some predetermined kinds of information, such as port number, (Internet Protocol) IP number, or anything recognizable by the priority tagging module 120. Moreover, the input module 110 could store the original traffics in a memory, a buffer, or a data structure, which can also be fixed or variable size.

The priority tagging module 120 of the scheduler 100 is configured to tag priority on each information chuck in the memory, buffer, or data structure of the input module 110. In an example of the embodiment, the priority tagging module 120 tags information chuck of the input module 110 with a high or a low priority. In other words, each information chuck would be tagged with a high priority or a low priority by the priority tagging module 120. Here for memory access, a priority scheme is configured to classify information chuck by port in an example. Otherwise, in another example, a priority scheme is configured to classify information chuck by the address range of a transaction. The present invention also applies to a combination of a plurality of priority classification scheme.

Figure 2:
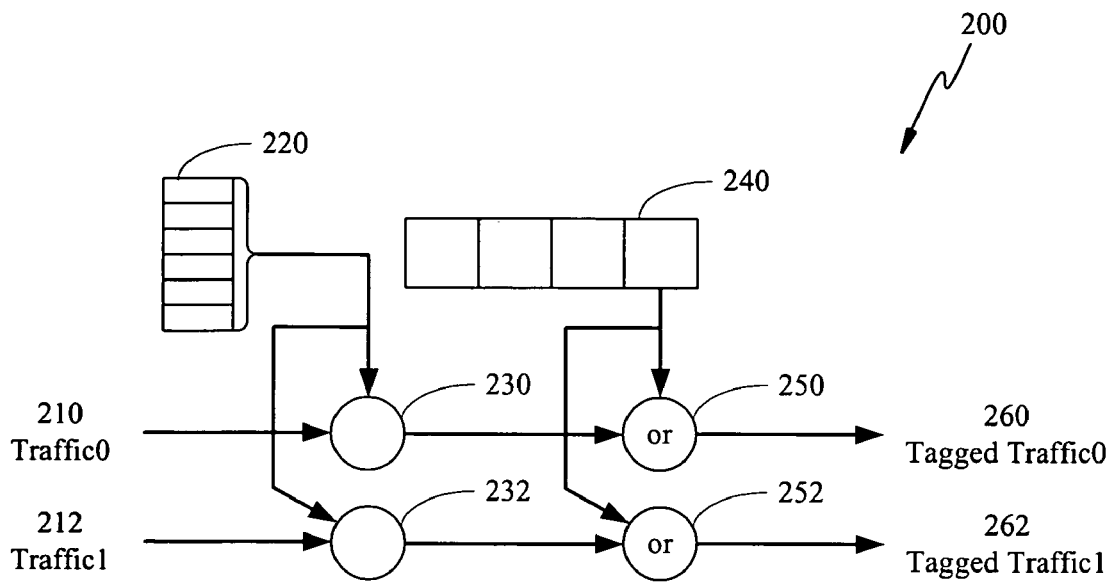
FIG. 2 is another priority tagging module which is functioned as the priority tagging module shown in the FIG. 1.

Now please refer to FIG. 2, which depicts another priority tagging module 200 which is functioned as the priority tagging module 120 shown in the FIG. 1. In this regards, the priority tagging module 200 of the present embodiment comprises at least one tagging line. However shown in the FIG. 2, the priority tagging module 200 comprises two tagging lines which are combined at least two priority schemes. A first traffic0 module 210 and a second traffic1 module 220, of a first tagging line and a second tagging line, respectively, can access the information chucks in the input module 110. A common address list 220, shared by both the first and second tagging lines, contains addresses or address ranges for applying high priority or low priority. When dealing with an information chuck from the first traffic0 210, a first comparison module 230 could compare whether it is high or low according to the address list 220. For example, if an information chuck is recognized in one of high priority address range of the address list 220, the first comparison module 230 will tag a high priority to this information chuck; otherwise, a low priority is given. Similarly, a second comparison module 232 serves the same function as the first comparison module 230 for the second tagging line.

As shown in FIG. 2, a common user pre-defined priority vector 240 is also shared by these two tagging lines. The elements of the priority vector 240 could be generated as high or low. When receiving a tagged information chuck from the first comparison module 230, a first logic calculation module 250 computes a logical OR operation on the last element of the priority vector 240 and the tag of the information chuck to generate a result to a first tagged traffic0 260. Similarly, a second logic calculation module 252 serves the same OR logical operation as the first logic calculation module 250 for the second tagging line and output a result to a second tagged traffic1 262. It is worthy noted that the plurality of tagging lines are not restricted to share the common address list 220 or the same priority vector 240. The present invention also applies to an individual address list 220 and a priority vector 240 for each tagging line.

Now returning to FIG. 1, the tagged traffics module 130 transports all tagged information chuck of all tagging lines to the WRR scheduling module 140. The present invention does not restrict to transport the tagged information chuck in parallel or in serial.

In this regards, the WRR scheduling module 140 is configured to determine the proper traffic from the tagged traffics module 130 to register to the queue module 160. In an example, the WRR scheduling module 140 is by request not by divided slots, that is, the WRR scheduling module 140 will come up an output whenever an input information chuck comes regardless to time slots. So there is no bandwidth waste in the WRR scheduling module 140. Moreover, the WRR scheduling module 140 could consider all high priority information chuck according to their corresponding weight to pick up one proper output traffic. If there is no high priority chuck at all, the WRR scheduling module 140 could consider the rest low priority chucks according to their corresponding weight in a predefined order.

Figure 3:
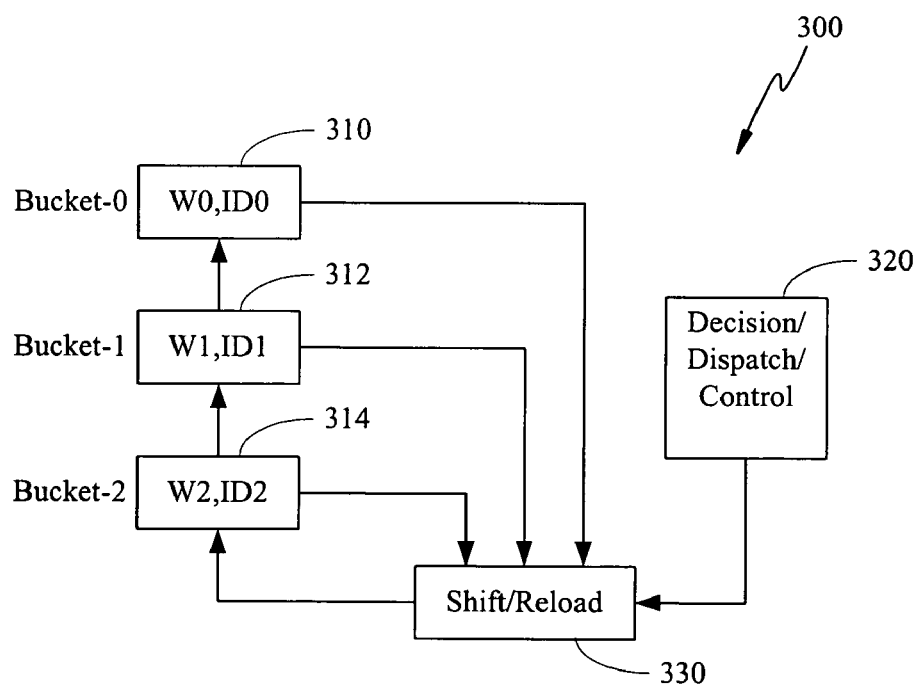
FIG. 3 is a detail block diagram of an embodiment of a WRR scheduling module in accordance with the present invention.

Now please refer to FIG. 3, which shows a detail block diagram of an embodiment of a WRR scheduling module 300 in accordance with the present invention. The WRR scheduling module 300 comprises a control module 320 for decision and dispatch, a shift/load module 330, and a plurality of storage units referred as buckets, such as Bucket-0 310, Bucket-1 312 and Bucket-2 314, for storing a weight and a traffic id of corresponding information chuck. Each bucket is associated with an ID, for example, bucket-0 depicts the number 0 storage unit. The lower ID number, the higher fixed priority is represented for the associated bucket. The function of the control module 320 would be described in the following paragraph. Besides, the shift/load module 330 is used to shift and/or load the content information chucks in this bucket list.

Figure 4:
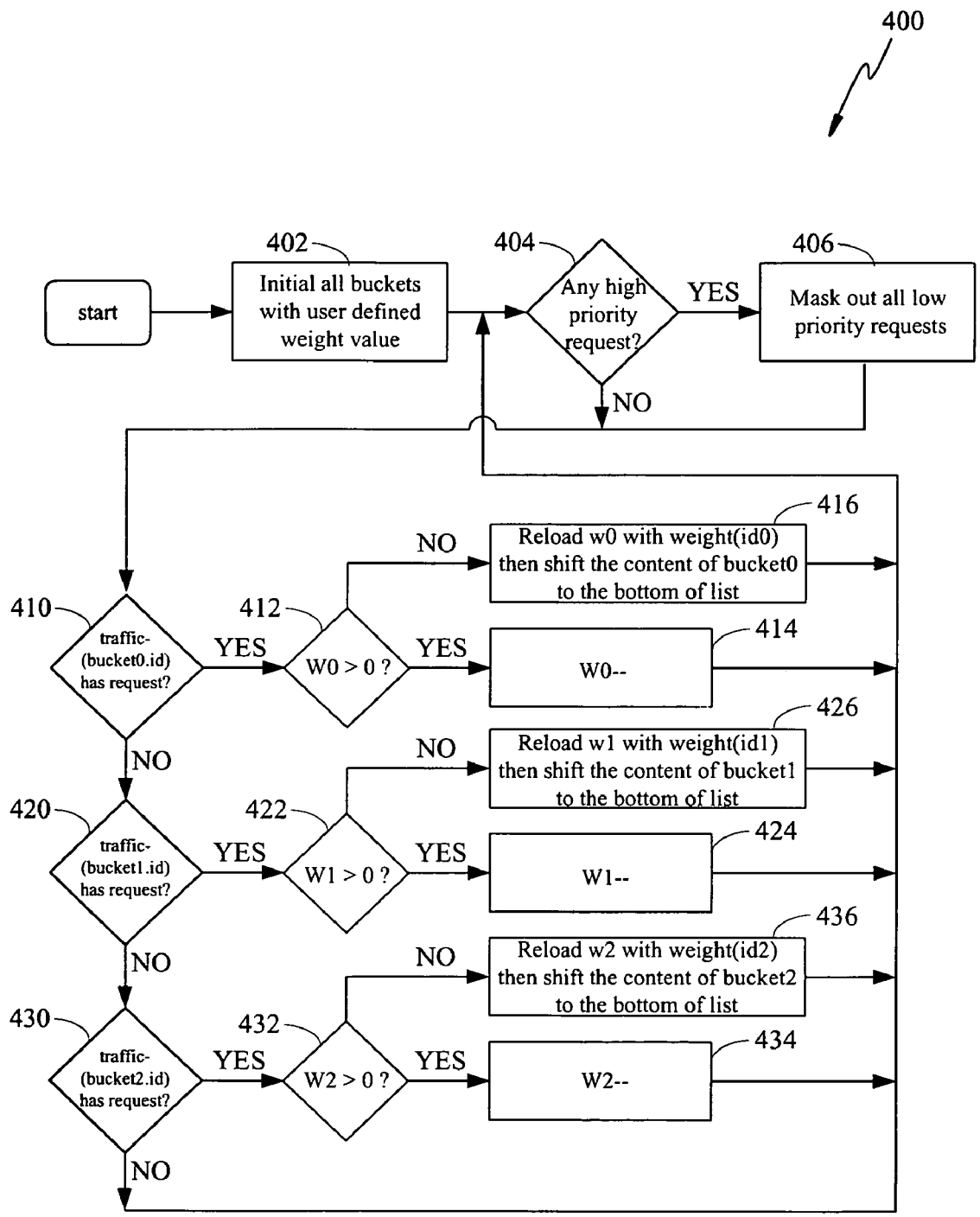
FIG. 4 is a flowchart diagram embodied in the control module shown in FIG. 3.

Please refer to FIG. 4, which is a flowchart diagram 400 embodied in the control module 320 shown in FIG. 3. After starting, processing step 402, all buckets are initialized with user-defined weight values. Next, processing decision step 404, determine whether any high priority information chuck existed. If so, then process step 406, to mask out all low priority information chucks; otherwise, go to step 410. In step 410, firstly check the id of the information chuck in bucket-0, say 1 in an example; determine whether the output traffic 1 has an information chuck at that moment in the consequence. If yes, the control module 320 will dispatch traffic1 and examine whether the weight of bucket-0 is larger than 0 in a step 412. If the weight is larger than 0, the control module 320 decreases the weight of bucket-0 in a following step 414; otherwise, the control module 320 notify the shift/load module 330 to reload the weight from traffic-1 and shift the content information chuck of bucket0 to the bottom of the bucket list in a step 416. After processing step 414 or 416, the flow returns to the previous step 404. In this regards, if there is no information chuck in the output traffic1 at that moment is determined, then the flow goes to step 420, which is similar to step 410. The sub-flows began at step 420 and at step 430 are similar to the sub-flow of step 410, 412, 414, and 416 all returns to previous step 416. As mentioned above, the shift/load module 330 takes care of all shifting and reload task to keep correctness of the WRR information chucks in all buckets.

Now return to FIG. 1, the output traffic module 150 implements the output traffics pickup by the WRR scheduling module 140 to indicate the result of strict weighted WRR scheduler. The queue module 160 followed the output traffic module 150 implements as a first-in first output data structure buffers to serve traffics in scheduling order when the number of buffers larger than the number of total high priority traffic inputs. The output module 170 followed the queue module 160 represents the final traffic for service unit to process information chucks from the input module 110 with strict WRR scheduling scheme.

Hence traffic starvation issue could be avoided regards to the following explain. In a posted request system, all accessing unit should wait for a grant of current request to issue next request. Here, a request comes from the input module 110 to get a grant at the output module 170. That is the maximum high priority requests/traffic would be queued in the queue module 160 till at least low priority request may register to the queue module 160 since the entry number of the queue module 160 is larger than the number of high priority traffics. Therefore a grant for high priority request may return to certain accessing unit to issue next high priority request. Due to there is always one spare vacancy for low priority traffic, all low priority traffic will be served in the faired order of the WRR scheduler module 140.

Figure 5:
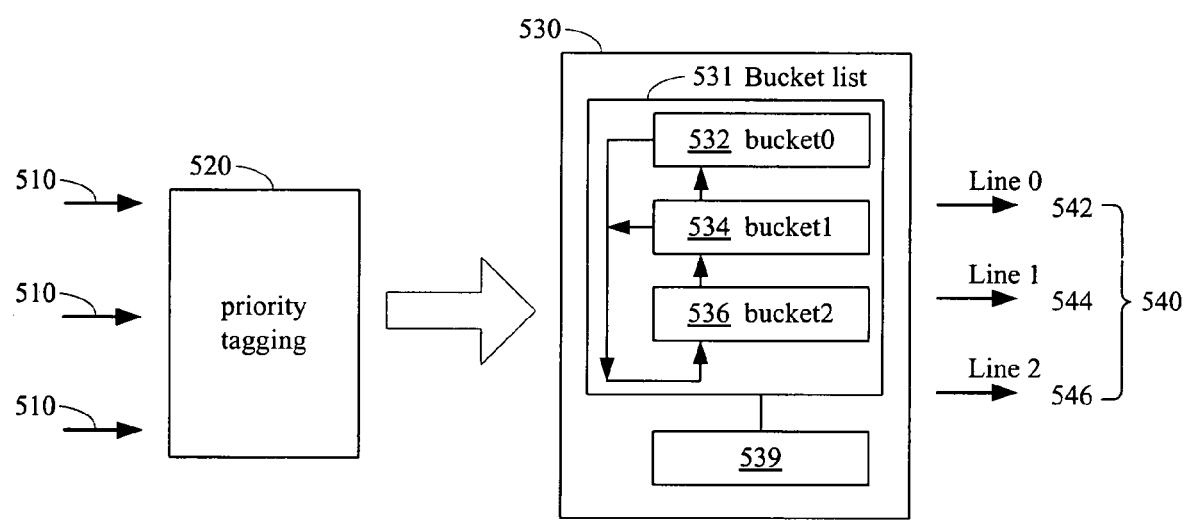
FIG. 5, which shows a scheduler in accordance with an embodiment of the present invention.

Please refer to FIG. 5, which shows a scheduler 500 in accordance with an embodiment of the present invention. The scheduler 500 comprises a plurality of input sources 510, a priority classification module 520, a WRR scheduling module 530, and a plurality of output lines 540. In this regards, the implementations of the scheduler 500 can be configured to handle incoming information chucks asynchronously. In other words, when a chuck arrived anyone of the plurality of input sources 510, it would be processed by the time of arrival.

In this embodiment, each arrived information chuck of input sources 510 is classified into a plurality of priority classes by the priority classification module 520 according to a priority scheme, such as a similar way of the embodiment shown in the FIG. 2. In a preferred example of the embodiment, the priority scheme is a combination with a pre-determination scheme and a random determination scheme. A chuck could be classified by the pre-determination scheme according to a pre-determined property, such as the arrived input source. In a random determination scheme, the classified chuck could be further assigned to a priority class randomly. Furthermore, the possibility of the random determination scheme could be dependent to the pre-determined classification class or not. The present invention does not restrict that whether the possibility of later random classification scheme is relevant to the pre-determination scheme. Moreover, the combination of these classification schemes is also implemented according to various considerations or configurations.

As shown in the FIG. 5, the plurality of output lines 540 comprises three output lines, line0 542, line1 544, and line2 546, respectively in the embodiment. Please note that the present invention does not restrict the number of the plurality of output lines 540. In this regards, the WRR scheduling module 530 comprises a bucket list 531 and a control module 539. There are several buckets in the bucket list 531. And the number of buckets is as the same as the number of output lines 540. For example, say that there are three buckets, a bucket0 532, a bucket1 534, and a bucket2 536 in the bucket list 531. In each bucket, a ticket is stored with an identification which represented a corresponding output line and a weight value of the correspondent output line. For example, say that initial user-defined weight values, w0, w1, and w2 for corresponding output line0 542, line1 544, and line2 546, respectively.

Figure 6:
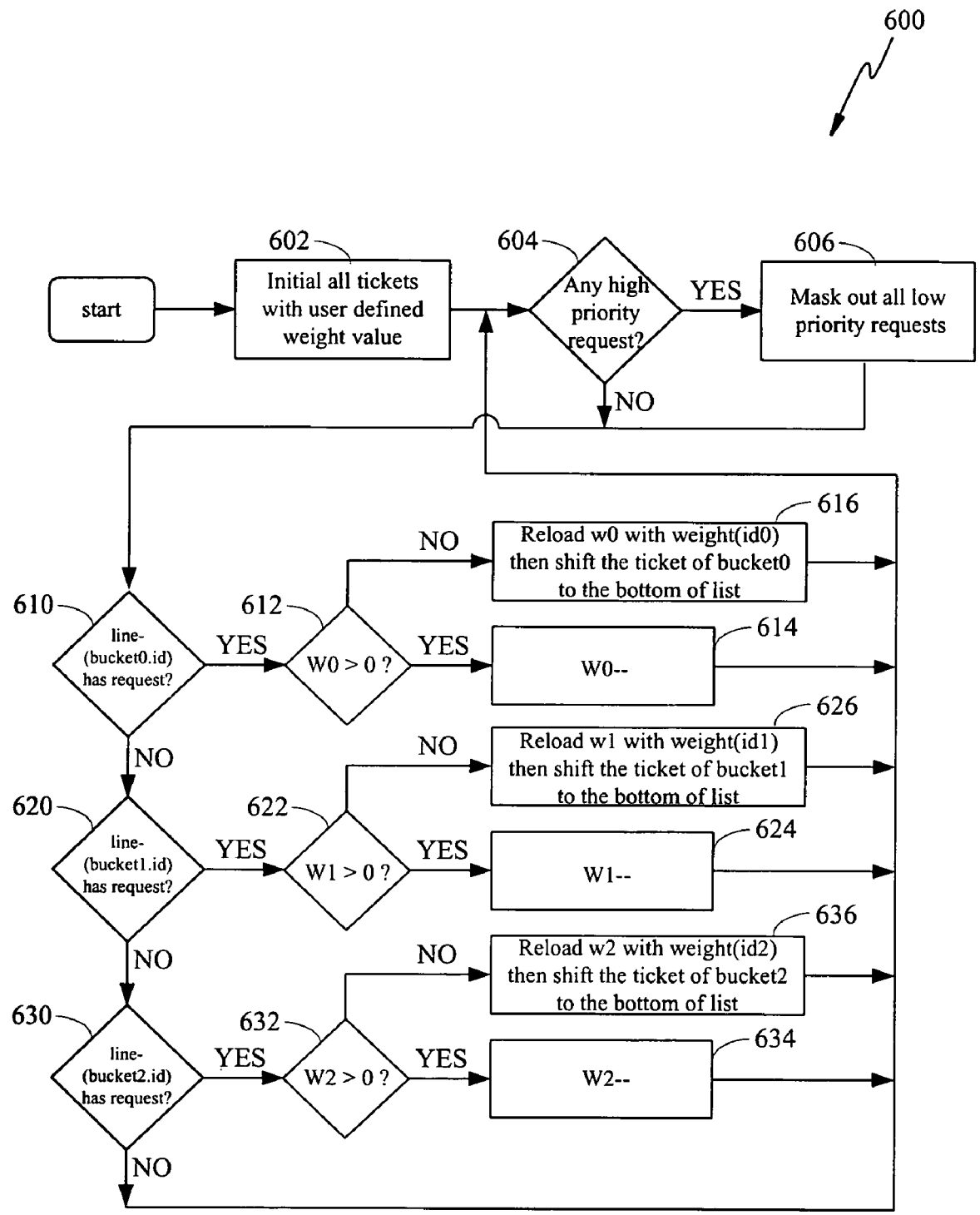
FIG. 6, which shows a flowchart diagram of the control module in accordance with the embodiment of this present invention.

Please refer to FIG. 6, which shows a flowchart diagram 600 of the control module 539 in accordance with the embodiment of this present invention. At the beginning step 602, all buckets 532, 534, and 536 are initialized with user-defined weight values; that is w0, w1, and w2, respectively. Next, in the following step 604, the control module 539 of the WRR scheduling module 530 would choose a chuck with a highest priority class from the priority classification module 520 for further scheduling in an example of this embodiment. Furthermore, if there is more than one chuck with the highest priority class, the control module 539 would choose an oldest chuck among them. If any high priority chuck existed, the control module 539 would mask out any other low priority chucks in a step 606. Anyway, the flowchart would go to a step 410.

In the step 610, the control module 539 would determine the identification of the ticket stored at the bucket0 532 of the bucket list 531. After the identification is determined, the control module 539 would determine whether the output line represented by the identification has chuck in waiting. If so, processing a step 612, the control module 539 would further determine that whether the weight value of the ticket is larger than 0. Once the weight value of the ticket is larger than 0, the control module 539 would dispatch the waiting chuck of the correspondent output line, represented by the identification, and decrease the weight value by 1. Otherwise, when the weight value of the ticket stored in the bucket0 532 is not larger than 0, the control module 539 would dispatch the waiting chuck and reload the initial weight value of the correspondent output line into the weight value of the ticket stored in the bucket0 532; then shift the ticket in the bucket0 532 to the bottom of the bucket list 531. In other words, the ticket in the bucket0 532 is moved to the bucket2 536, the ticket in the bucket2 536 would be moved to the bucket1 534, and the ticket in the bucket1 534 would be moved to the bucket0 532 in the exampled shift movement.

If it is determined that there is no chuck waiting in the output line in the step 610, the flowchart goes to a step 620 which is similar to the step 610. Processing the step 620, the control module 539 would determine the identification of the ticket stored at the bucket1 534 of the bucket list 531. After the identification is determined, the control module 539 would determine whether the output line represented by the identification has chuck in waiting. If so, processing a step 622, the control module 539 would further determine that whether the weight value of the ticket is larger than 0. Once the weight value of the ticket is larger than 0, the control module 539 would dispatch the waiting chuck of the correspondent output line, represented by the identification, and decrease the weight value by 1. Otherwise, when the weight value of the ticket stored in the bucket1 534 is not larger than 0, the control module 539 would dispatch the waiting chuck and reload the initial weight value of the correspondent output line into the weight value of the ticket stored in the bucket1 534; then shift the ticket in the bucket1 534 to the bottom of the bucket list 531. In other words, the ticket in the bucket1 534 would be moved to the bucket2 536 and the ticket in the bucket2 536 would be moved to the bucket1 534.

Similarly, if it is determined that there is no chuck waiting in the output line in the step 620, the flowchart goes to a step 630 which is similar to the step 620. Processing the step 630, the control module 539 would determine the identification of the ticket stored at the bucket2 536 of the bucket list 531. After the identification is determined, the control module 539 would determine whether the output line represented by the identification has chuck in waiting. If so, processing a step 632, the control module 539 would further determine that whether the weight value of the ticket is larger than 0. Once the weight value of the ticket is larger than 0, the control module 539 would dispatch the waiting chuck of the correspondent output line, represented by the identification, and decrease the weight value by 1. Otherwise, when the weight value of the ticket stored in the bucket2 536 is not larger than 0, the control module 539 would dispatch the waiting chuck and reload the initial weight value of the correspondent output line into the weight value of the ticket stored in the bucket1 534; then shift the ticket in the bucket2 536 to the bottom of the bucket list 531. In this example, since the bucket2 536 is the bottom bucket of the bucket list 531, there is no need for shift movement.

Now returning to FIG. 5, the plurality of output lines 540 may comprises first-in first-out structures as buffer of the scheduled chucks. This invention provides an apparatus with strict round robin scheduling order without starvation hazard to serve multiple requests in a preemptive faired behavior.

The foregoing description is not intended to be exhaustive or to limit the invention to the precise forms disclosed. Obvious modifications or variations are possible in light of the above teachings. In this regard, the embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the inventions as determined by the appended claims when interpreted in accordance with the breath to which they are fairly and legally entitled.

It is understood that several modifications, changes, and substitutions are intended in the foregoing disclosure and in some instances some features of the invention will be employed without a corresponding use of other features. Accordingly, it is appropriate that the appended claims be construed broadly and in a manner consistent with the scope of the invention.

The invention claimed is:

1. A scheduler, comprising:
    a priority tagging module for receiving a plurality of information chucks, wherein each information chucks are tagged with a priority tag by said priority tagging module according to a priority classification scheme;
    a plurality of output lines; and
    a WRR (weighted round robin) module, further comprising:
        a bucket list, wherein said bucket list comprises a plurality of buckets, each bucket stores a ticket, said ticket comprises an identification, represented one of said plurality of output lines, and an associated weight value of said represented output line; and
        a control module, wherein said control module receives said tagged information chucks from said priority tagging module and schedules said tagged information chucks into said plurality of output lines according to a scheduling scheme based on said bucket list.

2. A scheduler of claim 1, wherein said priority classification scheme is a combination of a pre-determination scheme and a random determination scheme.

3. A scheduler of claim 2, wherein said information chuck is classified into a plurality of priority classes by a property of said information chuck in said pre-determination scheme.

4. A scheduler of claim 2, wherein said information chuck is classified into a plurality of priority classes by a random in a given probability in said random determination scheme.

5. A scheduler of claim 1, wherein said plurality of output lines comprise first-in first-out queue structures.

6. A scheduler of claim 1, wherein said scheduling scheme based on said bucket list further comprising:
    a) choosing a chuck with a high priority tag;
    b) masking out other low priority tagged chucks;
    c) performing at least one procedure on a target bucket of said bucket list, wherein said procedure comprising:
        c1) determining that whether any chucks waited in an associated output line, represented by the identification of said ticket stored in said target bucket;
        c2) sending said waited chuck to said associated output line and determining that whether said weight value of said ticket stored in said target bucket is greater than zero when said c1 step is determined true;
        c3) decreasing said weight value of said ticket stored in said target bucket when said weight value is determined greater than zero in said c2 step; and
        c4) reloading said weight value of said ticket with an initial weight value associated with said output line and shift said ticket stored in said target bucket to the bottom bucket of said bucket list; and
    d) repeating said c step by assigning a next bucket of said target bucket as new said target bucket when said c1 step is not determined true.

7. A scheduler, comprising:
    a priority tagging module for receiving a plurality of information chucks, wherein each information chucks are tagged with a priority tag by said priority tagging module according to a priority classification scheme;
    a plurality of output lines; and
    a WRR (weighted round robin) module, further comprising:
        a bucket list, wherein said bucket list comprises a plurality of buckets, each bucket stores a ticket, said ticket comprises an identification, represented one of said plurality of output lines, and an associated weight value of said represented output line; and
        a control module, wherein said control module receives said tagged information chucks from said priority tagging module and schedules said tagged information chucks into said plurality of output lines according to a scheduling scheme based on said bucket list, wherein said scheduling scheme based on said bucket list further comprising:
            a) choosing a chuck with a high priority tag;
            b) masking out other low priority tagged chucks;
            c) performing at least one procedure on a target bucket of said bucket list, wherein said procedure comprising:
                c1) determining that whether any chucks waited in an associated output line, represented by the identification of said ticket stored in said target bucket;
                c2) sending said waited chuck to said associated output line and determining that whether said weight value of said ticket stored in said target bucket is greater than zero when said c1 step is determined true;
                c3) decreasing said weight value of said ticket stored in said target bucket when said weight value is determined greater than zero in said c2 step; and
                c4) reloading said weight value of said ticket with an initial weight value associated with said output line and shift said ticket stored in said target bucket to the bottom bucket of said bucket list; and d) repeating said c step by assigning a next bucket of said target bucket as new said target bucket when said c1 step is not determined true.

8. A scheduler of claim 7, wherein said priority classification scheme is a combination of a pre-determination scheme and a random determination scheme.

9. A scheduler of claim 8, wherein said information chuck is classified into a plurality of priority classes by a property of said information chuck in said pre-determination scheme.

10. A scheduler of claim 8, wherein said information chuck is classified into a plurality of priority classes by a random in a given probability in said random determination scheme.

11. A scheduler of claim 7, wherein said plurality of output lines comprise first-in first-out queue structures.

12. A scheduling method, comprising:
providing a scheduler, wherein said scheduler further comprising:
  a priority tagging module for receiving a plurality of information chucks, wherein each information chucks are tagged with a priority tag by said priority tagging module according to a priority classification scheme;
  a plurality of output lines; and
  a WRR (weighted round robin) module, further comprising:
    a bucket list, wherein said bucket list comprises a plurality of buckets, each bucket stores a ticket, said ticket comprises an identification, represented one of said plurality of output lines, and an associated weight value of said represented output line; and
    a control module, wherein said control module receives said tagged information chucks from said priority tagging module; and
  scheduling said tagged information chucks into said plurality of output lines according to a scheduling scheme based on said bucket list, wherein said scheduling scheme based on said bucket list further comprising:
    a) choosing a chuck with a high priority tag;
    b) masking out other low priority tagged chucks;
    c) performing at least one procedure on a target bucket of said bucket list, wherein said procedure comprising:
      c1) determining that whether any chucks waited in an associated output line, represented by the identification of said ticket stored in said target bucket;
      c2) sending said waited chuck to said associated output line and determining that whether said weight value of said ticket stored in said target bucket is greater than zero when said c1 step is determined true;
      c3) decreasing said weight value of said ticket stored in said target bucket when said weight value is determined greater than zero in said c2 step; and
      c4) reloading said weight value of said ticket with an initial weight value associated with said output line and shift said ticket stored in said target bucket to the bottom bucket of said bucket list; and
    d) repeating said c step by assigning a next bucket of said target bucket as new said target bucket when said c1 step is not determined true.

13. A scheduling method of claim 12, wherein said priority classification scheme is a combination of a pre-determination scheme and a random determination scheme.

14. A scheduling method of claim 13, wherein said information chuck is classified into a plurality of priority classes by a property of said information chuck in said pre-determination scheme.

15. A scheduling method of claim 13, wherein said information chuck is classified into a plurality of priority classes by a random in a given probability in said random determination scheme.

16. A scheduling method of claim 12, wherein said plurality of output lines comprise first-in first-out queue structures.

* * * * *